United States Patent Office 3,834,990
Patented Sept. 10, 1974

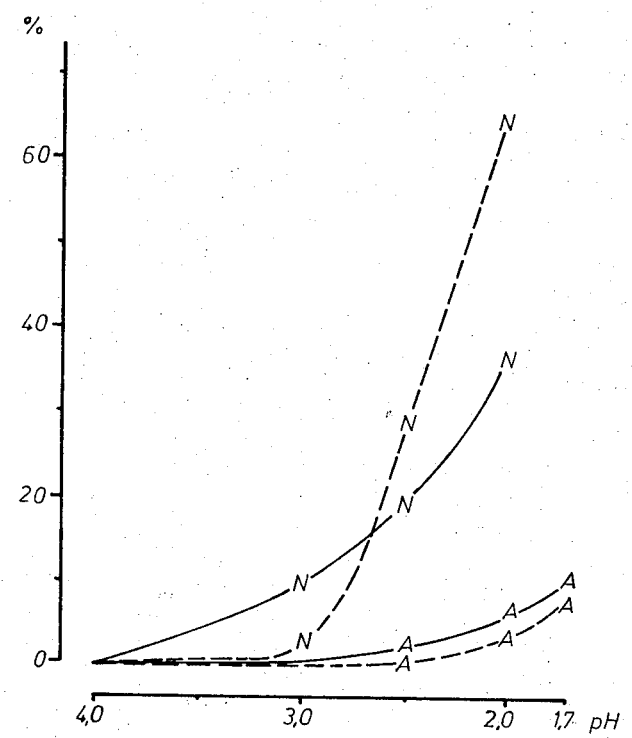

3,834,990
ISOLATION OF ENZYMES AND ENZYME INHIBITORS
Eugen Werle and Hans Fritz, Munich, Germany, assignors to Farbenfabriken Bayer Aktiengesellschaft, Leverkusen, Germany
Continuation of abandoned application Ser. No. 840,808, July 10, 1969. This application Feb. 24, 1972, Ser. No. 229,198
Claims priority, application Germany, July 15, 1968, P 17 68 934.8
Int. Cl. C07g 7/02
U.S. Cl. 195—68                        7 Claims

ABSTRACT OF THE DISCLOSURE

A process is provided for the enrichment of polypeptides such as enzymes or enzyme inhibitors by linking a polypeptide in a covalent linkage to a carrier to form an addition product of resinous nature into which addition product basic groups are introduced to render the product electrostatically nearly neutral. The resulting addition product in water is contacted with a solution of the substance to be enriched and capable of complexing with the fixed polypeptide and the complex is then washed, caused to dissociate and the complex-forming substance isolated.

---

This is a continuation of application Ser. No. 840,808, filed July 10, 1969, and now abandoned.

U.S. patent application Ser. No. 636,612, now abandoned, the contents of which are hereby made a part hereof, describes a process for the enrichment of substances wherein a polypeptide (I) is linked in a covalent linkage to an insoluble or soluble carrier and the addition product thus obtained is brought in contact in water with a solution containing substances (II) which are capable of forming a complex with the polypeptide (I), the complex thus obtained is purified by washing or by chromatography, caused to dissociate, and the complex-forming substance (II) is isolated.

The U.S. patent application mentioned above especially describes a process for the enrichment of enzyme inhibitors in the which an enzyme which is inhibited by the enzyme inhibitor concerned is linked to a carrier in a covalent linkage and the insoluble compound thus obtained is brought in contact in water with a solution of the enzyme inhibitor, the complex thus obtained is purified by washing, caused to dissociate, and the enzyme inhibitor is isolated.

The insoluble and soluble carriers to be used according to the process of the U.S. patent application mentioned above are primarily polymeric substances. These substances must contain functional groups which are capable of reacting with the aforesaid polypeptides, enzymes and enzyme inhibitors according to the methods of peptide chemistry. In this context there may first be mentioned those resins which contain anhydride groups, acid chloride groups, as well as those resins which contain activated fluorine atoms [Makromolekular-Chemie., 39 (1960) 13]. The known carboxyl-containing ion exchange resins which are commercially available can also be used after the introduction of activated groups. These resins are hereinafter called $A$-resins. These resins, especially those with anhydride groups, react in aqueous solution with peptides or proteins and at the same time with water, though more slowly. A polymer results with a large number of negatively charged anionic groups. If, at the same time, basic groups are introduced into these resins, there are obtained so-called poly-amphoteric resins in which the surplus negative charge of the resin is reduced or even approximately "neutralized;" these are hereinafter called $N$-resins.

It has now been found in accordance with the present invention that the processes of the U.S. patent application mentioned above can be substantially improved by using $N$-resins as carriers.

The following substantial advances are achieved in this way:

1. The $N$-resins usually have a higher binding capacity than the $A$-resins.
2. If $N$-resins are used, the compounds to be isolated can be isolated under substantially milder conditions, for example, at a less acidic pH value than with the use of $A$-resins (see drawing).
3. $N$-resins also bind enzymes and enzyme inhibitors with low isoelectric points, which are not bound, or are only very slightly bound, by $A$-resins. For example, kallikrein-inhibitor $N$-resins bind kallikrein which is not bound by kallikrein-inhibitor $A$-resins, and trypsin $N$-resins bind inhibitors from soya beans, egg white and serum which are not bound, or bound only to a considerably lower extent, by trypsin $A$-resins.

The $N$-resins are prepared by adding to the system of carrier and enzyme, or of carrier and enzyme inhibitor, at the suitable time, aliphatic and/or aromatic polyamines in which only one amino group is free while all other amino groups are protected from acylation. Examples of such amines are N,N-dimethyl-ethylene-diamine, agmatine, N-methyl-N'-(3-aminopropyl)-piperazine 4 - amino - pyridine, 2-amino-pyridine, 3-amino-1-cyclohexyl-aminopropane, etc.

When carrying out the isolation process, the resultant complex which is fixed to the $N$-resin is thoroughly washed with water and buffer solutions, in order to remove accompanying substances and impurities, and subsequently caused to dissociate. This dissociation can be achieved by shifting the pH and/or by modifying the ion concentration, and/or by displacement by means of competitive inhibitors or substrates, e.g., tryptamine or $n$-butylamine for trypsin, and/or by the addition of substances such as urea and guanidine salts which are capable of loosening or undoing molecular interactions, this being possibly achieved by a reversible denaturing of the proteins concerned.

Examples of enzymes which can be enriched, purified and isolated from their more or less impure solutions with the aid of the process according to the present invention are primarily trypsin, chymotrypsin, kallikrein, plasmin, pepsin, renin, ribonuclease, thrombin, amylase, papain, hyaluronidase, carbopeptidase A and B, pancreatopeptidase E, penicillinase and cholinesterases.

Inhibitors which can be enriched, purified and isolated according to the process of the present invention are primarily the known kallikrein-trypsin inhibitor [Kunitz inhibitor; Trasylol®]; the specific trypsin inhibitor obtained from pig pancreas and bovine pancreas, which exclusively inhibits trypsin; the trypsin inhibitor obtained from spermatoceles; and the trypsin inhibitors from plant seeds and potatoes.

Moreover, the process according to the present invention offers the likelihood of finding new inhibitors for known enzymes and, inversely, to find new enzymes which are inhibited by certain inhibitors. In the first-mentioned case, the enzyme concerned is linked in a covalent linkage to the carrier and the addition product thus obtained is treated with solutions which may contain inhibitors for this enzyme, until the biological activity of the enzyme subsides. The procedure for the last-mentioned case is analogous but reversed.

The process according to this invention has the advantage that it offers the likelihood of enriching, purifying and isolating also those polypeptides, enzymes and enzyme inhibitors the enrichment of which from impure solutions has hitherto been difficult and expensive, good yields and degrees of purity being obtained.

The invention is illustrated by the following non-limitative examples.

EXAMPLE 1

Preparation of the water-insoluble N-trypsin-resin (cf. Formula Scheme)

200 mg. of a copolymer of ethylene and maleic acid anhydride with an average molecular weight of about 30.000 (EMA-31-resin of Monsanto) were added with stirring to a mixture of 20 ml. of 0.1% hexamethylene-diamine and 75 ml. of a 0.2M salt-buffer solution (0.1M triethanolamine, 0.1M NaCl), pH 7.8, which had been cooled to 0–4° C. The suspension was briefly homogenized with cooling and mixed, 2 minutes after the addition of the resin, with a cooled (0–4° C.) solution of 1 g. of trypsin in 75 ml. of the salt-buffer solution. After stirring this reaction mixture for 4 minutes, there was added an aqueous solution of 4 g. of N,N-dimethyl-ethylene-di-amine (mixed with water in a molar ratio of 1:1 and adjusted to pH 7.8 with 2N HCl), the cooled reaction mixture was stirred for 2 hours and subsequently centrifuged. The supernatant solution still contained 320 mg. of trpysin, i.e. 69% of the trypsin used was linked to the water-insoluble resin. The water-insoluble trypsin N-resin was mixed with twice its volume of formylated or ethanolized cellulose powder, poured into a column cooled to 0–4° C., and then washed with a salt-buffer solution (0.1M tri-ethanolamine, 0.1M NaCl, 0.01M $CaCl_2$), pH 7.8, for a sufficient period of time (overnight) so that no more tryptic activity could be detected in the flow. Similar yields of trypsin N-resins are obtained when the N,N-dimethyl-ethylenediamine is replaced with the other amines mentioned in the general part.

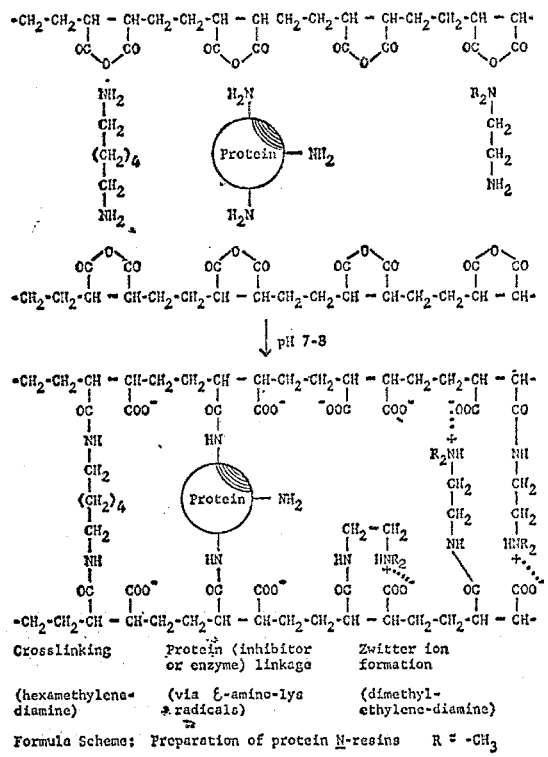

Formula Scheme: Preparation of protein N-resins  R = -CH₃

EXAMPLE 2

Isolation of inhibitors with the aid of the trypsin N-resin (a) Specific trypsin inhibitor from pig pancreas.—The extract from pig pancreas which has been freed from high-molecular proteins by treatment with 3% perchloric acid [cf. H. Fritz. G. Hartwich and E. Werle, Z. Physiol. Chem., 348, 150 (1966)] contained the inhibitor with a specific activity of 0.014 ImU/µg. of biuret-protein (for definition of ImU see the above literature reference: 1 ImU for trypsin inhibits approximately 1 µg. Trypure Novo®).

The trypsin N-resin, prepared from 10 g. of trypsin, was stirred into the inhibitor-containing neutral solution (2.14 litres; 745,000 ImU for trypsin) while cooling to 0–4° C. After stirring for 2½ hours (0–4° C.) the mixture was centrifuged and the supernatant solution was discarded. The insoluble inhibitor/trypsin resin complex was subsequently stirred 3 times (0–4° C.) with a 0.2M salt-buffer solution (0.1M triethanolamine; 0.1M NaCl; 0.01M $CaCl_2$), and each time the solution supernatant after centrifuging was discarded. The resin complex was then slurried with a 0.2M KCl solution, the pH of the suspension adjusted to 2.0 by the addition of 2N HCl, and the suspension was then stirred for 1½ hours while cooling. The mixture was subsequently centrifuged and the residue (enzyme resin plus resin complex) again treated with a 0.2M KCl/HCl solution, pH 2.0, as described above. The two combined supernatant solutions contained a total amount of inhibitor of 458,600 ImU for trypsin, i.e. 68.5% of the amount used for isolation. The specific activity of the inhibitor preparation amounted to 0.32 ImU/µg. biuret-protein and after desalting through a Sephadex-G-25 column (dextran gel available from Pharmacia, Uppsala, Sweden) to 2.73 ImU/µg. biuret-protein.

The attached drawing illustrates the dissociation properties of the inhibitor from pig pancreas for a complex with N- and A-inhibitor resin, respectively. It can be seen that the detachment from the N-resin takes place in a less acidic range than that from the A-resin.

In the drawing the trypsin N-resins were prepared as herein described; the trypsin A-resins analogously, but without the addition of N,N-dimethyl-ethylene-diamine. The solid line curves represent trypsin N- or A-resin complex with kallikrein inhibitor; the broken line curves represent trypsin N- or A-resin complex with the specific trypsin inhibitor from pig pancreas; and the ordinate line indicates percentage of the inhibitor detached from the complex at the respective pH value of the suspension.

(b) The polyvalent kallikrein inhibitor from bovine organs (Kunitz inhibitor; Trasylol® was enriched via the trypsin N-resin in a manner analogous to that for the specific trypsin inhibitor from pig pancreas described in 2(a). The dissociation properties of the water-insoluble complex of the polyvalent inhibitor with a trypsin N- and A-resin, respectively, at different pH values of the aqueous suspension is likewise shown in the drawing. The starting material was a technical kallikrein inhibitor. A pure kallikrein inhibitor with a specific activity of 3.75 ImU/µg. of protein was obtained therefrom via the trypsin N-resin with a yield of 86% [experimental details as in 2(a)].

(c) Inhibitor from soya beans.—The trypsin-chymotrypsin inhibitor from soya beans (molecular weight approx. 23,000) was enriched in a manner analogous to that described in Example 2(a). The starting preparation was a technical inhibitor preparation (inhibitor from soya beans, pract., lyophil, available from Serva, Heidelberg) with a specific activity of 0.35 ImU for trypsin per µg. of biuret-protein. 149,400 ImU for trypsin were completely fixed to a neutral trypsin N-resin prepared from 5 g. of trypsin. After stirring the trypsin N-resin complex in a 0.3M KCl-HCl buffer for one hour, 135,000 ImU, i.e. 90% of the fixed amount, were in the supernatant solution (150 ml.). After desalting through a Sephadex-G-25 column (120 x 3 cm., 0.01M collidine acetate buffer, pH 8.0), the specific activity of the inhibitor from soya beans thus isolated amounted to 2.0 ImU/µg. of biuret protein, corresponding to an almost 6-fold enrichment.

EXAMPLE 3

Preparation of the water-insoluble inhibitor-(Trasylol®)-resins

Anionic (A)-resin: To 23 ml. of a 0.2M phosphate buffer, pH 8.0, plus 2.0 ml. of a 0.1% hexamethylene-diamine solution (HMD) there were added 120 mg. of a copolymer of ethylene and maleic anhydride in the molecular weight range of 30.000 to 80.000 (for example the resins "EMA 31®" or "EMA 81®") are available from Monsanto. The mixture was briefly homogenized, stirred, mixed with a solution of 200 mg. (approx. 600,000 ImU for trypsin) of the trypsin-kallikrein inhibitor in 30 ml. of the same phosphate buffer exactly 5 minutes after the addition of the resin (3 minutes in the case of EMA-31-resin). The reaction mixture was stirred in a refrigerator overnight (16 hours), then centrifuged, and the amount of non-fixed inhibitor in the supernatant solution was determined. The precipitated inhibitor resin was washed several times with 0.2M triethanolamine buffer, pH 7.8, until the wash water remained free from inhibitor. All operations were carried out with cooling to 0 to 4° C.

Neutral (N)-resin: Mixture as for the A-resin. Exactly 8 minutes after the addition of the inhibitor solution to the resin suspension (EMA-81), the reaction mixture (resin+inhibitor) was additionally admixed with a solution of 1.6 g. N,N-dimethyl-ethylene-diamine (NND) in a little water (proportion by volume 1:1), which had been adjusted to pH 9 with 2N HCl. The mixture so obtained was stirred for a further 2 hours, then centrifuged, and the insoluble inhibitor resin was further treated as described above. Another N-resin, where the N,N-dimethyl-ethylene-diamine hydrochloride was added to the reaction mixture (resin+inhibitor) after 5 minutes, instead of after 8 minutes, is also set forth in the following Table:

TABLE

| Type of resin used | Stirring time after addition of— HMD | Stirring time after addition of— NND | Amount of inhibitor fixed to the resin as percent | Name of inhibitor resin |
|---|---|---|---|---|
| EMA-31 | 3 | | 92 | A-resin. |
| EMA-71 | 5 | 8 | 81 | $N_8$-resin. |
| EMA-81 | 5 | 5 | 32 | $N_5$-resin. |

(a) Adsorption and dissociation of trypsin and chymotrypsin on anionic (A) and neutral (N) inhibitor resins.—Adsorption: The inhibitor resin is slurried with about 20 ml. of 0.1M triethanolamine buffer (plus 0.1M NaCl plus 0.01M $CaCl_2$), pH 7.8, and mixed with an excess of the enzyme dissolved in a little buffer. After stirring for 2 hours (optionally overnight), the mixture is centrifuged and the amount of residual enzyme in the supernatant solution is determined. The insoluble resin complex is washed with buffer, pH 7.8, until no more enzyme activity can be detected in the wash water. Working temperature: 0 to 4° C.

Dissociation and elution: After the last wash, the insoluble enzyme inhibitor resin complex is slurried in about 50 ml. of a 0.3M KCl solution and the desired pH value of the suspension is adjusted by the addition of 2N HCl. After stirring the acidic suspension for 2 hours, it is again centrifuged and the enzyme activity in the supernatant solution is determined. For complete detachment of the enzyme from the resin, this operation is repeated (3 to 4 times with 50 ml. each time) until no appreciable amounts of enzyme can be detected in the supernatant solution.

| Inhibitor resin used, amount of inhibitor fixed to the resin | | Amount of enzyme adsorbed | | Amount of enzyme detached as percent (of the amount of enzyme adsorbed) at pH | | | | | |
|---|---|---|---|---|---|---|---|---|---|
| Type | [IU] for trypsin | Mg. | Percent [a] | 3.5 | 3.0 | 2.5 | 2.0 | 1.7 | Total |
| Trypsin | | | | | | | | | |
| A | 66.8 | 11.8 | 18 | | 0 | 0 | 1 | 9 | 60 |
| $N_5$ | 42.9 | [b]18.8 | 44 | | 1 | 11 | 36 | 69 | 90 |
| Chymotrypsin | | | | | | | | | |
| A | 66.8 | 3.7 | 3.5 | 0 | 1 | 6 | 17 | | 17 |
| $N_5$ | 42.9 | 15.7 | 37 | 31 | 45 | 37 | | | 80 |

[a] Referred to the amount of enzyme which would be inhibited by the same amount of inhibitor in solution.
[b] At the first use of the resin 27.3 mg. (64%[a]); after 4 uses constant with 13 mg. (30%[a]).

(b) Enrichment of kallikrein with the aid of neutral inhibitor resins.—The inhibitor resins $N_5$ and $N_8$ were used. For adsorption, the kallikrein was dissolved in about 20 ml. of 0.1M triethanolamine buffer (plus 0.1M NaCl), pH 7–8, and the inhibitor resin was stirred into the kallikrein solution. After stirring for about 14 hours (overnight, 2 hours are sufficient), the mixture is centrifuged and the non-fixed kallikrein in the supernatant solution is determined. The insoluble kallikrein inhibitor resin complex is washed with buffer until free from kallikrein and protein.

The kallikrein was detached from the inhibitor resin complex by means of 0.38–1M guanidine salt solutions which were adjusted to the desired pH value with a 0.1M sodium acetate buffer. For complete detachment of the kallikrein, the resin complex must be stirred 4 to 5 times in about 20 ml. of the guanidine salt solution for 1 hour and the inhibitor resin must then be centrifuged of (working temperature 0 to 4° C.).

| Inhibitor resin, amount of inhibitor fixed to the resin | | Amount of kallikrein absorbed | | Amount of kallikrein detached as percent (of the amount of kallikrein adsorbed) with 0.4–1M guanidine salt solutions at pH | | | |
|---|---|---|---|---|---|---|---|
| Type | [IU][a] | [KU][b] | Percent[c] | 7.0 | 6.0 | 5.0 | Total |
| $N_8$ | 110.9 | 9,790 | 4.9 | 15 | 53 | 59 | 72 |
| $N_7$ | 221.9 | 24,940 | 6.2 | | 64 | | 64 |

[a] ImU for trypsin: 1 ImU inhibits about 1 μg. trypsin and corresponds to 0.27 μg. of the pure inhibitor and to 0.32 μg. of the present inhibitor preparation.
[b] 1KU (biological kallikrein unit [1] is effected by about 0.7 μg. protein of the pure kallikrein.
[c] Referred to amount of enzyme which is inhibited by the same amount of inhibitor in solution.
[1] E.K. Frey, H. Kraut and E. Werle, Kallikrein-Padutin, F. Enke-Verlag, Stuttgart (1950).
[2] H. Fritz, I. Eckert and E. Werle, Z. physiol. Chem. 348, 1120 (1967).

What is claimed is:

1. A process for the enrichment of enzymes and enzyme inhibitors which comprises linking a polypeptide selected from enzymes and enzyme inhibitors in a covalent linkage to a polyanhydride carrier to form an addition product, contacting the addition product with a polyamine having one free amino group to render the addition product essentially electrostatically neutral, contacting the neutralized addition product with a solution of a polypeptide to be enriched selected from enzymes and enzyme inhibitors, wherein said polypeptide is in an inhibiting structure relationship with the addition product linked polypeptide and forms a complex therewith, purifying the resulting complex by washing, causing the complex to dissociate and then isolating dissociated enriched polypeptide.

2. The process of claim 1 wherein the said polyanhydride carrier is an ethylene-maleic anhydride copolymer.

3. The process of claim 1 wherein the said polyanhydride carrier is linked to an enzyme polypeptide.

4. The process of claim 1 wherein the said polyanhydride carrier is linked to an enzyme inhibitor polypeptide.

5. The process of claim 1 wherein said enzymes are proteolytic enzymes.

6. A process which comprises linking an enzyme to a polyanhydride carrier to form an addition product, wherein said enzyme is selected from trypsin, chymotrypsin, kallikrein, plasmin, pepsin, renin, ribonuclease, thrombin, amylase, papain, hyaluronidase, carboxypeptidase, pancreatopepitase, penicillinase and cholinesterase, contacting the addition product with a polyamine having one free amino group to render the addition product essentially electrostatically neutral, contacting the neutralized addition product with a solution of a polypeptide capable of inhibiting the addition product linked enzyme to form a complex, purifying the resulting complex by washing, dissociating the enzyme inhibitor from the complex and recovering an enriched solution of enzyme inhibitor.

7. The process of claim 6 wherein said polyamine is N,N-dimethylethylenediamine.

References Cited
UNITED STATES PATENTS

| | | | |
|---|---|---|---|
| 3,630,841 | 12/1971 | Werle et al. | 195—Dig. 11 X |
| 3,157,595 | 11/1964 | Johnson et al. | 210—54 |
| 3,208,918 | 9/1965 | Beers, Jr. | 195—66 |

OTHER REFERENCES

Levin et al.: A Water-Insoluble Polyanionic Derivative of Trypsin, Biochemistry, vol. 3, No. 12, 1964 (pp. 1905–1912).

Dixon et al.: Enzymes, 2nd ed., Academic Press, Inc., New York, 1964 (pp. 315–318 and 358–359).

DAVID M. NAFF, Primary Examiner

U.S. Cl. X.R.

195—63, Dig. 11